United States Patent [19]

Zielinski

[11] Patent Number: 5,061,735

[45] Date of Patent: Oct. 29, 1991

[54] PROCESS FOR THE SEPARATION OF PLASTICS

[75] Inventor: Michael P. Zielinski, Toledo, Ohio

[73] Assignee: Plastic Recovery Systems, Inc., Toledo, Ohio

[21] Appl. No.: 567,927

[22] Filed: Aug. 15, 1990

[51] Int. Cl.$^5$ .............................................. C08J 11/00
[52] U.S. Cl. .................................. 521/46.5; 521/40.5; 521/46; 521/45.5; 521/47; 209/11
[58] Field of Search ..................... 521/46.5, 45.5, 40.5, 521/47, 46; 209/11

[56] References Cited

U.S. PATENT DOCUMENTS

| | | | |
|---|---|---|---|
| 3,976,563 | 8/1976 | Scalco | 521/46.5 |
| 4,067,826 | 1/1978 | Emery | 521/46.5 |
| 4,105,593 | 8/1978 | Stavrinov | 521/46.5 |
| 4,148,702 | 4/1979 | Lane | 521/46.5 |

*Primary Examiner*—Allan M. Lieberman
*Attorney, Agent, or Firm*—Marshall & Melhorn

[57] ABSTRACT

Thermoplastic materials are separated and recovered, according to the present invention, utilizing a process wherein a mixture of the thermoplastic material to be recovered and one or more contaminants are simultaneously heated and agitated. The mixture is heated to the temperature at which the thermoplastic will adhere to itself, but at which the contaminant has not become tacky. Impacting thermoplastic particles agglomerate, while the contaminant particles do not adhere to other contaminant particles or to the thermoplastic particles. The resulting mixture is passed through a series of screens of increasing mesh size to separate the larger thermoplastic particles from the smaller contaminant particles.

18 Claims, No Drawings

5,061,735

PROCESS FOR THE SEPARATION OF PLASTICS

FIELD OF THE INVENTION

This invention relates generally to a process for the separation and recovery of plastics, and more particularly to a process for the separation of thermoplastics from mixtures containing the desired thermoplastic and one or more other plastics or non-plastics. The thermoplastic and other materials are generally recovered from waste materials, such as for example insulated electrical wire and cable scrap, other forms of mixed industrial scrap containing recoverable plastics, and municipal scrap containing mixed recoverable plastics.

BACKGROUND OF THE INVENTION

Mixtures of waste materials containing desirable plastics and other materials are often processed to recover either or both of the plastic and other components. Such methods include burning the mixture to remove the plastic component, dissolving the plastic component in a chemical solvent to recover the non-plastic and a solution of the plastic component, electrostatic separation, separating the components by a flotation process, and separating by a thermal process.

U.S Pat. No. 3,268,071 discloses a process for separating a mixture of two comminuted solids. The mixture is suspended in a liquid, which is treated so as to cause one of the solids to be lyophilic and the other to be lyophobic A bridging liquid is thereafter added to cause the lyophobic particles to agglomerate for removal by, for example, filtering.

In those methods based upon a flotation process, density modifiers are often used to adjust the specific gravity of the bath, in order to float plastics having a greater specific gravity than the pure bath liquid U S. Pat. Nos. 4,578,184 and 4,728,045 generally disclose the use of a water bath which may be density-modified by the addition of salts to form an aqueous solution. These methods, however, are ineffective in separating plastics having similar specific gravities. Additionally, certain materials may not be separable by these methods due to particle size distribution effects, or small particle sizes which cause surface effects to dominate over gravitational forces.

A thermal process for separating polyvinyl chloride and polyethylene terephthalate is disclosed in "PVC Melt Point Keys Scrap Separation," Modern Plastics, June 1990. pp 15 and 16. A mixture of PVC and PET is precisely metered out onto a conveyor belt which transports it through a heating chamber maintained at the melt point for PVC. When the PVC becomes molten, it adheres to the conveyor belt. Separation occurs at the end of the conveyor belt, where the PET drops off and the PVC is scraped off of the belt.

It must be noted that the prior art referred to above has been collected and examined only in light of the present invention as a guide. It is not to be inferred that such diverse art would otherwise be assembled absent the motivation provided by the present invention.

It would be desirable to develop a process for separating thermoplastics from mixtures containing the thermoplastic and a contaminant, which would provide a high level of purity of the thermoplastic material recovered, could be operated economically, and would not require post cleaning of the reclaimed thermoplastic prior to its reprocessing.

SUMMARY OF THE INVENTION

Accordant with the present invention, it has surprisingly been discovered that a thermoplastic may be separated and recovered from a mixture containing comminuted particles of the thermoplastic and a contaminant, comprising the steps of:

A) heating the mixture to a temperature sufficient to cause the thermoplastic to adhere to itself;

B) simultaneously agitating the mixture so that the thermoplastic particles impact against one another, agglomerating to form larger thermoplastic particles;

C) cooling the mixture;

D) agitating the mixture during at least a portion of the cooling thereof; and

E) sorting the mixture to separate the relatively larger thermoplastic particles from the relatively smaller contaminant particles.

This process is particularly useful for separating and reclaiming thermoplastic PVC and thermoset rubber from wire and cable scrap.

DETAILED DESCRIPTION OF THE PREFERRED EMBODIMENT

Thermoplastic materials are separated and recovered, according to the present invention, utilizing a process wherein a mixture of the thermoplastic material to be recovered and one or more contaminants are simultaneously heated and agitated. The term "contaminant" is used herein to mean the following: non-plastic materials such as metal, glass ceramics, stone, etc.; thermoset materials such as, for example, polyisoprene, polybutadiene, methyl methacrylate-butadiene-styrene (MBS) rubbers, acrylic latexes, EPDM rubbers, cross-linked polyethylene, cellulose, etc.; as well as thermoplastic materials other than the thermoplastic to be recovered, where such other thermoplastic materials have higher primary transition temperatures than that of the desired thermoplastic, and do not adhere to the desired thermoplastic at the temperature required to cause the desired thermoplastic to adhere to itself.

Agitation induced collisions between thermoplastic particles cause the particles to heat up and agglomerate, while the contaminant particles, which are either non-melting or have a melting point above that of the thermoplastic, do not adhere to the thermoplastic particles. The larger thermoplastic, agglomerated particles are then sorted from the smaller contaminant particles.

Generally, the mixtures of thermoplastic and contaminant material to be separated and recovered subject to the process of the present invention are produced from plastic-containing waste materials which are initially cut or chopped into small pieces in such a manner so as to disengage the thermoplastic and contaminant components. This comminution step results in a mixture of discrete thermoplastic and contaminant pieces, which may then be charged to the process of the present invention. Methods for comminuting plastic-containing waste materials, such as for example wire and cable scrap, are well known in the art.

The comminuted mixture of thermoplastic and contaminant particles is heated to a temperature sufficient to cause the thermoplastic to become tacky and adhere to itself. This temperature, as referred to herein, shall be denoted the material's "stick point". Generally, if the thermoplastic has a true melting point, that is its stick point. If the thermoplastic does not have a true melting point, its stick point is some temperature above its glass transition temperature where it becomes tacky and adheres to itself The mixture is agitated at the same time that it is being heated Agitation of the mixture during the heating step is vital: it prevents the formation of a single mass of material, which would otherwise form if the mixture were heated to the stick point of the thermoplastic while the particles were in a static state. Additionally, agitation of the mixture causes the thermoplastic particles to impact one another, and provides for uniform heating of the mixture. Collisions between thermoplastic particles which are at their stick point result in the agglomeration of these particles, whereby larger thermoplastic particles are formed.

In a preferred embodiment, the mixture of thermoplastic and contaminant particles is charged to the chamber of a rotary mechanical shearing device, such as the REGENOLUX ® Nelmor/Weiss Densification System available from Nelmor Co., Inc., North Uxbridge, Mass. Intensive mixers, such as those available from Henschel Mixers, Houston, Tex., or Welex Inc., King of Prussia, Pa. are also suitable if modified to include means for cooling the mixture. The mixture is agitated so that the particles impact the rotary blades, the walls of the chamber, and other particles within the chamber. The mixture is agitated with enough force so that the resulting mechanical friction eventually heats the mixture to the melting point of the thermoplastic, causing the thermoplastic particles to agglomerate upon impact with other thermoplastic particles. Advantageously, a fluid jacket filled with steam or the like may be used to heat the chamber walls, decreasing the time necessary to raise the temperature of the mixture. The contaminant particles, which do not reach their stick point, if one exists, do not adhere to the other contaminant particles or to the thermoplastic particles. The resulting mixture includes thermoplastic particles which are substantially larger than the contaminant particles.

After the temperature of the mixture reaches the stick point of the thermoplastic, it is advantageous to cool the mixture to avoid completely melting the thermoplastic particles. The mixture is preferably cooled by the introduction of a sufficient amount of water to cool the mixture by evaporative cooling to a temperature below the stick point of the thermoplastic. The mixture must be agitated during the cooling thereof to maintain distinct thermoplastic and contaminant particles within the mixture, preventing the engagement of contaminant particles between adjacent thermoplastic particles as cooling occurs.

The temperature at which the thermoplastic will adhere to itself, and at which cooling of the mixture is initiated, may be determined by any conventional method. Preferably, the stick point of the thermoplastic is determined by monitoring the current through the drive motor of the mechanical shearing device. As the stick point of the thermoplastic is reached, there is a significant increase in the frictional forces experienced by the device, and a corresponding increase in current. When this increase is detected, cooling of the mixture is initiated.

In some applications it may be advantageous to perform an additional cycle or cycles of heating and agitation to obtain a higher percentage of thermoplastic material which has formed into larger, agglomerated particles. Upon completion of any additional cycles, the mixture is discharged from the chamber and sorted by separating the relatively larger thermoplastic particles from the relatively smaller contaminant particles. Preferably, the mixture is passed through a series of screens of increasing mesh size. The largest particles, removed first from the mixture, are nearly pure agglomerated thermoplastic. The smallest are nearly all contaminant particles which remained in their small, comminuted state throughout the above-described process. Particles of intermediate size comprise a mixture of thermoplastic and contaminant particles which are reprocessed according to the present invention along with additional thermoplastic and contaminant mixture.

Thermoplastic materials which are suitable for practicing the present invention include, for example, polyvinyl chloride, polyurethanes, polyesters, polystyrene, polyethylene, polypropylene, and the like.

The thermoplastic materials of the present invention may furthermore contain conventional adjuvants such as for example thermal stabilizers, dyes, flame retardants, reinforcing agents, softeners, mold release agents, pigments, plasticizers, antistatic agents, ultraviolet radiation absorbers, lubricants, and fillers, in conventional amounts generally not exceeding 50% of the total weight.

The following specific example illustrates the operation of the process of the invention:

A fifty pound mixture of comminuted polyvinyl chloride (90% by weight) and thermoset rubber (10% by weight) was charged to the mixing chamber of a REGENOLUX ® Nelmor/Weiss Densification System, which had previously been in operation and was warmed up. The system was operated for a seven minute cycle, when water was sprayed into the chamber to cool the mixture. The mixture had reached a temperature of approximately 280° F. at the time of spray. The mixture was continually agitated during the heating and cooling thereof. Once all of the water had evaporated, the mixture was discharged from the bottom chute of the chamber. Finally, the mixture was passed through a series of screens of increasing mesh size to remove the agglomerated polyvinyl chloride particles. The material separated by the No 4 mesh screen contained less than 0.1% thermoset rubber.

The invention is more easily comprehended by reference to specific embodiments which are representative of the invention. It must be understood, however, that the specific embodiments are provided only for the purpose of illustration, and that the invention may be practiced otherwise than as specifically illustrated without departing from its spirit and scope.

What is claimed is:

1. A process for separating a desired thermoplastic from a mixture containing comminuted particles of the thermoplastic and a contaminant, comprising the steps of:
   A) heating the mixture to a temperature sufficient to cause the thermoplastic to adhere to itself;
   B) simultaneously agitating the mixture so that the thermoplastic particles impact against one another, agglomerating to increase the size of the thermoplastic particle to form larger thermoplastic particles while the particle size of the contaminant does not increase and the contaminant does not adhere to the thermoplastic during agglomeration of the thermoplastic particles.

2. The process according to claim 1, wherein the mixture is heated by friction generated from agitation of the mixture.

3. The process according to claim 2, wherein the mixture is heated and simultaneously agitated by means of a rotary mechanical shearing device.

4. The process according to claim 1, wherein the mixture is passed through a grading device to separate the relatively larger thermoplastic particles from the relatively smaller contaminant particles.

5. The process according to claim 4, wherein the mixture is passed through a series of screens of increasing mesh size to separate the relatively larger thermoplastic particles from the relatively smaller contaminant particles.

6. The process according to claim 1, wherein the mixture is cooled by exposure to water.

7. The process according to claim 1, wherein the contaminant comprises a thermoset.

8. The process according to claim 1, wherein the thermoplastic comprises polyvinyl chloride.

9. A process for separating and reclaiming thermoplastic polyvinyl chloride and thermoset rubber from a comminuted mixture of the two, comprising the steps of:
   A) heating the mixture to a temperature sufficient to cause the thermoplastic polyvinyl chloride to adhere to itself;
   B) simultaneously agitating the mixture by means of a rotary mechanical shearing device so that the particles of thermoplastic polyvinyl chloride impact against one another, agglomerating to form larger particles of thermoplastic polyvinyl chloride;
   C) cooling the mixture by exposure to water;
   D) agitating the mixture during at least a portion of the cooling thereof; and
   E) passing the mixture through a grading device to separate the relatively larger particles of thermoplastic polyvinyl chloride from the relatively smaller particles of thermoset rubber.

10. A process as defined in claim 1 in which the thermoplastic is polyethylene.

11. A process as defined in claim 1 in which the thermoplastic is polystyrene.

12. A process as defined in claim 1 in which the thermoplastic is polypropylene.

13. A process as defined in claim 1 in which the thermoplastic is polyethylene and the contaminant is cellulose.

14. A process as defined in claim 1 in which the thermoplastic is polystyrene and the contaminant is cellulose.

15. A process as defined in claim 2 in which the contaminant is thermoset rubber.

16. A process as defined in claim 1 in which the contaminant is thermoset rubber and the thermoplastic is polyethylene.

17. A process for separating thermoplastic particles from contaminated particles in a scrap material mixture that is cut into small pieces, the thermoplastic particles having a stick point temperature, the stick point temperature being its melting point or a temperature above its glass transition temperature where the thermoplastic becomes tacky and the thermoplastic particles adhere to themselves, the contaminant having a different stick point than the thermoplastic particles so that the contaminant particles do not adhere to one another or the thermoplastic particles at the stick point temperature of the thermoplastic particles, the process comprising the steps of:
   A) heating and agitating the thermoplastic particles and contaminant particles;
   B) increasing the size of the thermoplastic particles but not the size of the contaminant particles by agglomerating the thermoplastic particles at their stickpoint temperature;
   C) cooling the mixture having the thermoplastic particles with increased size; and
   D) separating the thermoplastic particles with increased size from the contaminant particles by screening with a screen equivalent to a No. 4 mesh screen in which the contaminant particles pass through the screen but the thermoplastic particles do not.

18. A process as defined in claim 17 in which the thermoplastic is polyvinyl chloride, polyethylene or polystyrene, and the contaminant is thermoset rubber or cellulose.

* * * * *